United States Patent
Zhang (10) Patent No.: US 9,513,990 B2
(45) Date of Patent: Dec. 6, 2016

(54) MEMORY CONTROLLER WITH READ UNIT LENGTH MODULE

(71) Applicant: EMPIRE TECHNOLOGY DEVELOPMENT LLC, Wilmington, DE (US)

(72) Inventor: Tong Zhang, Watervliet, NY (US)

(73) Assignee: Empire Technology Development LLC, Wilmington, DE (US)

( * ) Notice: Subject to any disclaimer, the term of this patent is extended or adjusted under 35 U.S.C. 154(b) by 93 days.

(21) Appl. No.: 14/494,319

(22) Filed: Sep. 23, 2014

(65) Prior Publication Data
US 2016/0085624 A1    Mar. 24, 2016

(51) Int. Cl.
*H03M 13/00*    (2006.01)
*G06F 11/10*    (2006.01)
*H04L 1/00*    (2006.01)

(52) U.S. Cl.
CPC .......... *G06F 11/1016* (2013.01); *H04L 1/0083* (2013.01)

(58) Field of Classification Search
None
See application file for complete search history.

(56) References Cited

U.S. PATENT DOCUMENTS

| | | | |
|---|---|---|---|
| 5,485,469 A * | 1/1996 | Suzuki | H03M 13/35 360/74.5 |
| 6,487,685 B1 | 11/2002 | Stuart Fiske et al. | |
| 6,961,890 B2 | 11/2005 | Smith | |
| 8,023,358 B2 * | 9/2011 | Kim | G11C 5/00 365/233.1 |
| 2003/0091339 A1 * | 5/2003 | Isozaki | H04N 9/8066 386/208 |
| 2008/0082544 A1 * | 4/2008 | Dunstan | H04L 1/0061 |
| 2009/0055605 A1 * | 2/2009 | Wu | G11C 11/56 711/161 |
| 2012/0155173 A1 * | 6/2012 | Lee | G11C 16/26 365/185.09 |

(Continued)

OTHER PUBLICATIONS

Choi, Y., et al. "A 20nm 1.8V 8Gb PRAM with 40MB/s program bandwidth," IEEE International Solid-State Circuits conference (ISSCC), Feb. 19-23, 2012, pp. 46-48.

(Continued)

*Primary Examiner* — Daniel McMahon
(74) *Attorney, Agent, or Firm* — Moritt Hock & Hamroff LLP; Steven S. Rubin, Esq.

(57) ABSTRACT

Technologies are generally described for systems, devices and methods relating to generation of an instruction to store data. Read unit length information are identified for data. The read unit length information includes a read unit length. The data has a data length. The data length implicates a first error correction code of a first size. The read unit length relates to an amount of the data to be read as a unit from a memory. The read unit length is different from the data length. A second error correction code is determined to store the data. The second error correction code is based on the read unit length information. The second error correction code has a second size. The instruction is effective to store the second error correction code in association with the data in the memory.

20 Claims, 5 Drawing Sheets

(56) References Cited

U.S. PATENT DOCUMENTS

2014/0122974 A1* 5/2014 Yun ................. G06F 11/1004
714/773
2016/0072529 A1* 3/2016 Suzuki ............. H03M 13/2909
714/755

OTHER PUBLICATIONS

Diao, Z., et al., "Spin-transfer torque switching in magnetic tunnel junctions and spin-transfer torque random access memory," Journal of Physics, Apr. 6, 2007, pp. 1-13, vol. 19.
Jiang, L., et al., "Improving Write Operations in MLC Phase Change Memory," IEEE 18th International Symposium on High Performance Computer Architecture, Feb. 25-29, 2012, pp. 1-10.
Kitagawa, E., et al., "Impact of ultra low power and fast write operation of advanced perpendicular MTJ on power reduction for high-performance mobile CPU," IEEE International Electron Devices Meeting (IEDM), Dec. 10-13, 2012, pp. 29.4.1-29.4.4.
Strikos, N., "Low-Current Probabilistic Writes for Power-Efficient STT-RAM Caches," IEEE 31st International Conference on Computer Design, 2013, pp. 511-514.

\* cited by examiner

MEMORY CONTROLLER WITH READ UNIT LENGTH MODULE

BACKGROUND

Unless otherwise indicated herein, the materials described in this section are not prior art to the claims in this application and are not admitted to be prior art by inclusion in this section.

A memory device may include a multitude of transistors controlled by a memory controller. A memory controller may be configured to control access to data stored within the transistors. Memory devices may include one or more memory blocks of transistors. Each transistor may be configured to store one bit of data. An error correction code may be used to correct errors stored in and/or read from the transistors. For example, the error correction code may provide some redundancy or checksum-like functionality to help confirm whether retrieved data includes errors.

SUMMARY

In some examples, methods to generate an instruction to store data are generally described. The methods may include identifying read unit length information for data received by a memory controller. In some examples, the read unit length information may include a read unit length. In various other examples, the data may have a data length. In still other examples, the data length may implicate a first error correction code of a first size. In some examples, the read unit length may relate to an amount of the data to be read as a unit from a memory. The read unit length may be different from the data length. In various examples, the methods may include determining a second error correction code to store the data. In some examples, the second error correction code may be determined based on the read unit length information. In some other examples, the second error correction code may have a second size different from the first size. In some examples, the methods may further include generating the instruction to store the second error correction code in association with the data in a memory.

In some examples, memory controllers effective to generate an instruction for data to be written to a memory are generally described. The memory controllers may include an error correction code engine. In some other examples, the memory controllers may include a read unit length module. In various examples, the read unit length module may be effective to be in communication with the error correction code engine. In some examples, the read unit length module may be effective to identify read unit length information for received data. The read unit length information may include a read unit length. In some examples, the data may have a data length. The data length may implicate a first error correction code of a first size. The read unit length may relate to an amount of the data to be read as a unit from the memory. In some further examples, the read unit length may be different from the data length. In other examples, the error correction code engine may be effective to determine a second error correction code to store the data. In some examples, the second error correction code may be determined in response to the read unit length information. The second error correction code may have a second size which may be different from the first size. In some examples, the error correction code engine may be further effective to determine a write speed based on the second error correction code. In still other examples, the error correction code engine may be further effective to generate the instruction for the data to be written to the memory at the write speed.

In some other examples, methods to generate an instruction for data to be written to a memory chip are generally described. In some examples, the methods may include determining read unit length information for data. The read unit length information may include a read unit length. In some examples, the data may have a data length. The data length may implicate a first write speed and a first error correction code of a first size. In various examples, the read unit length information may relate to an amount of the data to be read as a first unit from the memory chip. In still other examples, the read unit length may be different from the data length. In some examples, the methods may include determining a second error correction code for the data. The second error correction code may be determined in response to the read unit length information. In various examples, the second error correction code may have a second size different from the first size. In some examples, the methods may further include determining a second write speed based on the second error correction code. The second write speed may be different from the first write speed. In some examples, the methods may further include generating the instruction for the data to be written to the memory chip at the second write speed.

In some other examples, memory devices effective to store data are generally described. The memory devices may include a memory controller. The memory devices may further include one or more memory cells configured to be in communication with the memory controller. In some examples, for data that has a data length that implicates a first error correction code of a first size, the memory controller may be effective to receive a second error correction code in association with the data. The second error correction code may be based on a read unit length for the data. In various examples, the read unit length may relate to an amount of the data to be read as a unit from the one or more memory cells. In some other examples, the read unit length may be different from the data length. In other examples, the second error correction code may have a second size which may be different from the first size. In some other examples, the memory devices may be further effective to write the data to the one or more memory cells at a write speed. In some examples, the write speed may be based on the second error correction code.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations.

This disclosure is generally drawn to, inter alia, methods, apparatus, systems, devices, and computer program products related to a memory controller with read unit length module.

Briefly stated, technologies are generally described for systems, devices and methods relating to generation of an instruction to store data. Read unit length information may be identified for data received by a memory controller. In some examples, read unit length information may be received from an application or an operating system. The read unit length information may include a read unit length. The data may have a data length. The data length may implicate a first error correction code of a first size. For example, the read unit length may relate to an amount of the data to be read as a unit from a memory. The read unit length may be different from the data length. A second error correction code may be determined to store the data. The second error correction code may be determined in response to the read unit length information. The second error correction code may have a second size different from the first size. The instruction may be generated to store the second error correction code in association with the data in a memory.

Figure 1:
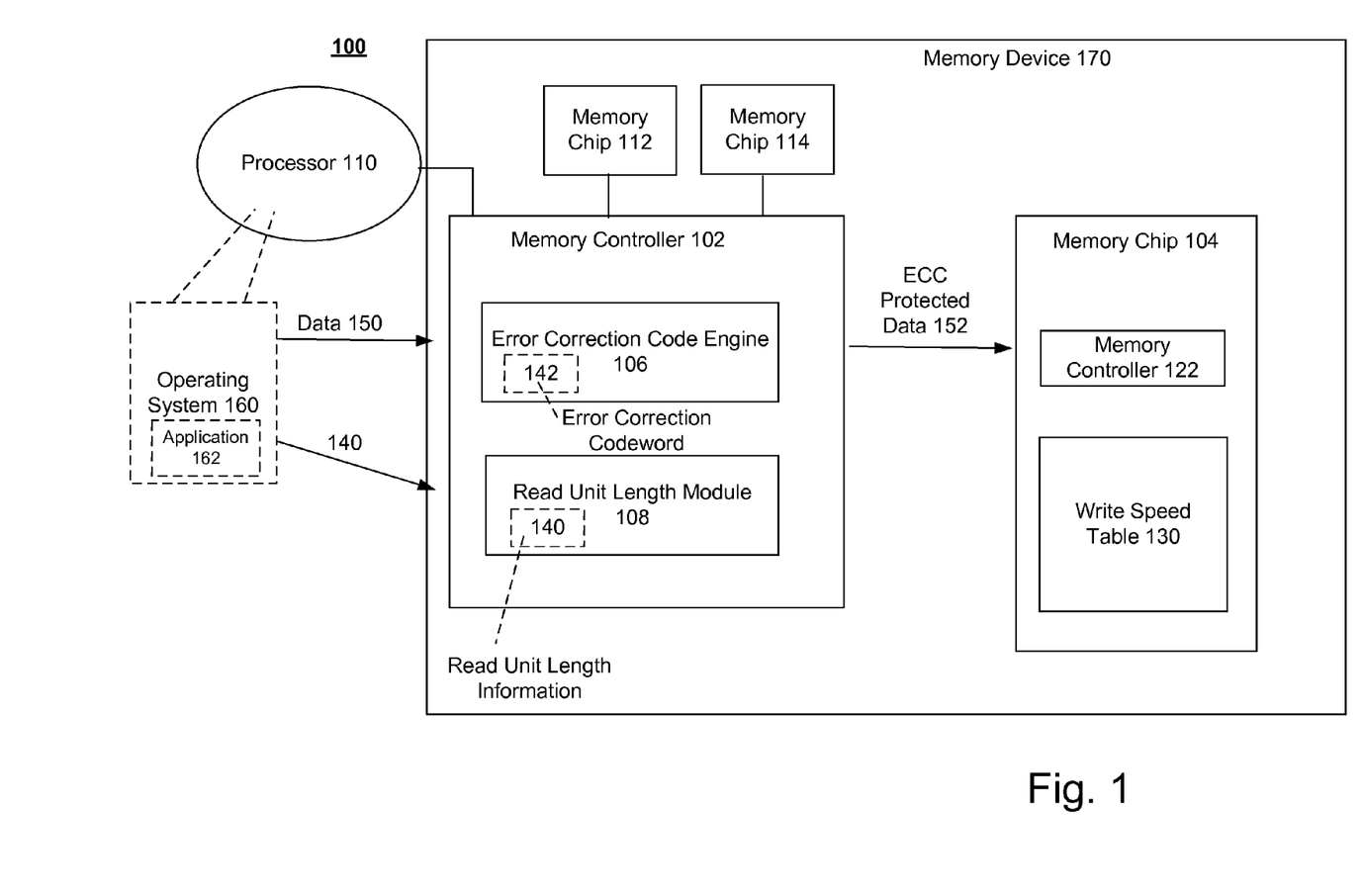
FIG. 1 illustrates an example system that can be utilized to implement a memory controller with read unit length module.

FIG. 1 illustrates an example system 100 that can be utilized to implement a memory device 170 with read unit length module, arranged according to at least some embodiments described herein. Memory device 170 may include a memory controller 102, and one or more memory chips, including memory chips 104, 112, and/or 114. A processor 110 may be configured to be coupled to or otherwise in communication with memory controller 102. Memory controller 102 may be configured to be coupled to or otherwise in communication with, and control access to, memory chips 104, 112, and/or 114. Memory chips 104, 112, and/or 114 may include memory cells which may be grouped into one or more planes, blocks, and/or pages. Memory chips 104, 112, and/or 114 may be effective to store data within the memory cells. In some examples, memory chips 104, 112, and/or 114 may include volatile and/or non-volatile memories, such as spin-transfer torque random access memory ("STT-RAM"), phase-change memory ("PCM"), resistive memory ("ReRAM"), and/or other types of volatile and non-volatile memory technologies.

Memory chip 104 may include a memory controller 122. Memory controller 122 may be effective to control write speeds of data written to cells of memory chip 104. In some examples, memory controller 102 may control a steering current through memory cells of memory chip 104 to store bits as resistance values. Memory chip 104 may include write speed table 130. As will be discussed in further detail below, write speed table 130 may be embodied as a data structure effective to store information related to write error probabilities and/or write speeds. A write error probability may be, for example, the probability of an incorrect value for a bit being stored in a cell of memory chip 104. In some examples, memory controller 102 may be effective to generate an instruction for memory controller 122 to store data in memory cells of memory chip 104 at a particular latency or speed, based upon information stored in write speed table 130.

Memory controller 102 may include error correction code engine 106. Error correction code engine 106 may be instantiated in hardware, or in some combination of hardware and instructions executable on the hardware. Error correction code engine 106 may be effective to verify and/or correct errors in data written to memory chip 104. For example, error correction code engine 106 may add one or more redundant bits to received data 150 to form error correction code ("ECC") protected data 152 and ECC protected data 152 may be written to memory chip 104. When ECC engine 106 forms ECC protected data 152, redundant bits may be used to represent a portion of data 150. In some examples, two or more redundant bits may be combined to form one or more error correction codewords 142.

Error correction codewords 142 may be used by memory controller 102 to detect and/or correct errors in data 150. Error correction codewords 142 may include a number of bits. For example, error correction codewords 142 may be of different lengths or sizes, in terms of the number of redundant bits. Error correction codewords 142 may be associated with data 150 to produce ECC protected data 152. Longer error correction codewords 142 may offer stronger error correction capability relative to shorter error correction codewords 142. For example, a first error correction codeword of 64 bytes may result in a $1 \times 10^{-3}$ probability of a bit storage error, while a second error correction codeword of 512 bytes may result in a $1 \times 10^{-6}$ probability of a bit storage error.

Memory controller 102 may include a read unit length module 108. Read unit length module 108 may be instantiated in hardware, or in some combination of hardware and instructions executable on the hardware. Read unit length module 108 may be effective to receive and/or identify read unit length information 140 associated with data to be written to memory chips 104, 112, and/or 114. In an example, an operating system 160 or an application 162 may send data 150 and read unit length information 140 to memory controller 102. Read unit length information 140 may include a read unit length. For example, processor 110 may access data stored in memory chips 104, 112, and/or 114 with different levels of granularity. For example, for a given amount of data 150 to be written to memory chip 104, read unit length information 140 may define the minimum (or an otherwise reduced) number of bits (or bytes) that may be read together as a unit from memory chip 104. Read unit length information 140 may be of a length (in terms of a number of bits) that may be different from the total number of bits in data 150.

For example, in a first application, 64 bits may be the minimum (or an otherwise reduced) amount of data that may be read together as a unit from memory chip 104. In this example, read unit length information 140 may be 64 bits. In a second application, 512 bits may be the minimum (or an otherwise reduced) amount of data which may be read together as a unit. In the second application, a read unit length of read unit length information 140 may be 512 bits. In various examples, read unit length module 108 may receive an instruction from the application 162 under execution by processor 110. The instruction may include read unit length information 140 for the application. In another example, read unit length module 108 may receive read unit length information 140 in the form of an instruction generated by the operating system 160 of system 100. In other examples, read unit length module 108 may be configured to determine read unit length information 140 based on data being written to memory chips 104, 112, and/or 114. As will be discussed in further detail below, a particular error correction codeword 142 for data 150 may be implicated by, and/or determined in response to, read unit length information 140. In turn, the speed at which ECC protected data 152 may be written to memory chips 104, 112, and/or 114 may be adjusted based on the particular error correction codeword 142. In some other examples, error correction code engine 106 may be configured to include error correction codewords 142 of default bit lengths when read unit information 140 is unavailable.

In an example, a length of data may implicate ECC of a first size. The ECC of the first size may, in turn, implicate a write speed for the data. Read unit length information 140 may implicate ECC of a second size (different from the first size), which may, in turn, implicate a second speed. For example, 512 bits of data to be written to memory chip 104 may be divided into 64 bit chunks. The 64 bit chunks of data may implicate an ECC of a first size, which, in turn, may implicate a first write speed. However, if read unit information 140 indicates that 512 bits of the data will be read together as a unit, all 512 bits may be protected with ECC of a second size, which, in turn, may implicate a second write speed. In various examples, the first write speed may be slower than the second write speed.

Figure 2:
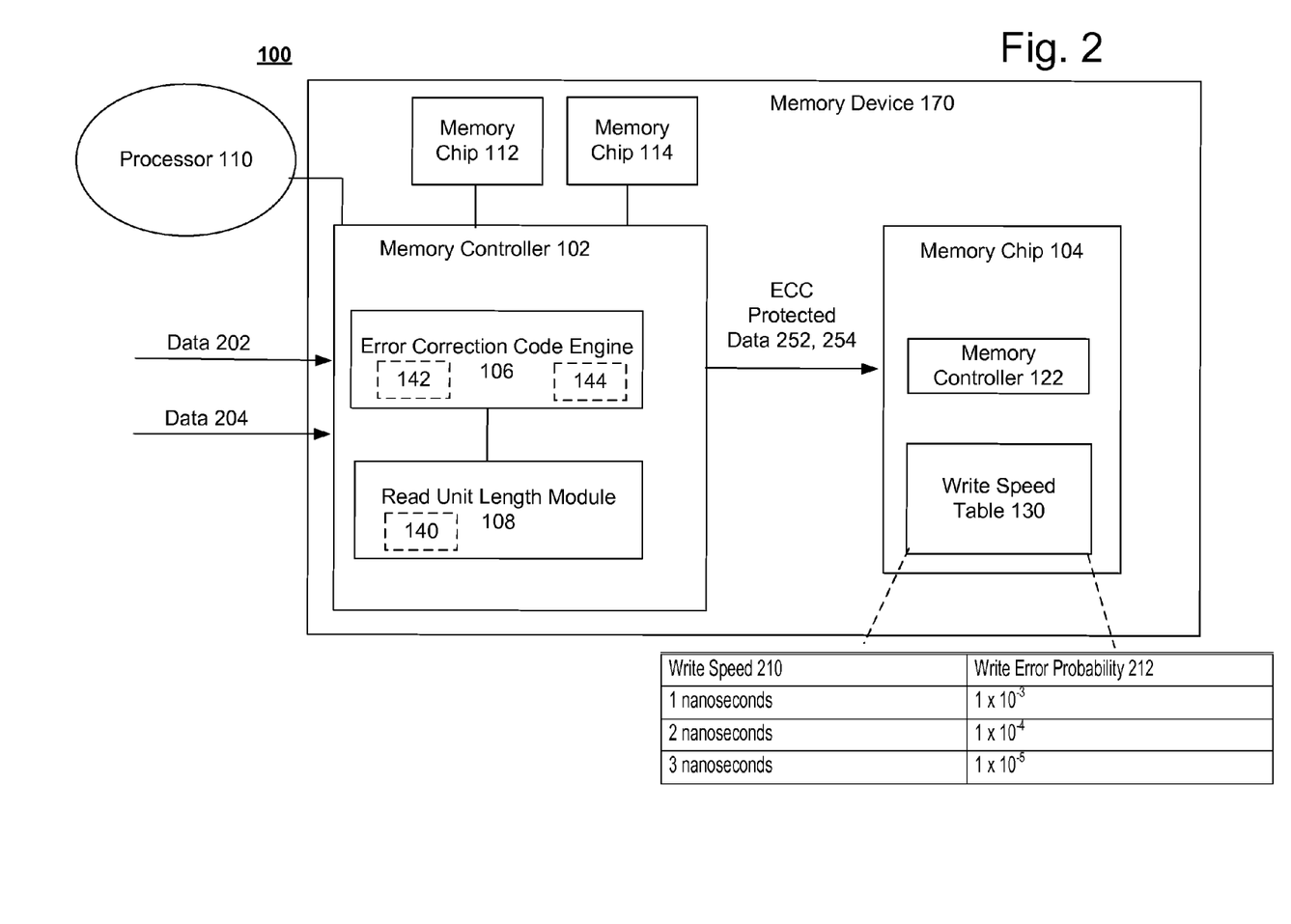
FIG. 2 depicts the example system of FIG. 1 that may be used to implement a memory device with a read unit length module, including additional details related to a write speed table.

FIG. 2 depicts the example system 100 that may be used to implement a memory device with a read unit length module, including additional details related to a write speed table, arranged in accordance with at least some embodiments described herein. Those components in FIG. 2 that are labeled identically to components of FIG. 1 will not be described again for the purposes of clarity and brevity.

In some examples, error correction code engine 106 may determine a length of a particular error correction codeword 142 in response to read unit length information 140. For example, received data 202 may include information that is to be written to memory chip 104. Read unit length module 108 may determine that read unit length information 140 for data 202 may be 64 bits, as data 202 may be read in 64 bit increments. Error correction code engine 106 may receive read unit length information 140. Error correction code engine 106 may receive read unit length information 140 from read unit length module 108 and/or from operating system 160 or an application 162. Error correction code engine 106 may determine that error correction codeword 142 should be 8 bits in length, based on read unit length information 140. Error correction code engine 106 may add error correction codeword 142 to data 202 to produce ECC protected data 252. In another example, read unit length module 108 may determine that read unit length information 140 for received data 204 may be 512 bits, as data 204 may be read in 512 bit increments. In this example, error correction code engine 106 may determine that error correction codeword 142 should be 64 bits in length, based on read unit length information 140. Error correction code engine 106 may add error correction codeword 144 to data 204 to produce ECC protected data 254. In some examples, the length of a particular error correction codeword 142 may be proportional or otherwise related to a size of read unit length information 140.

Error correction code engine 106 may be configured to determine a probability of a bit read or write error based on the length of a particular error correction codeword 142. For example, the probability of a bit being written in error may be determined to be $1 \times 10^{-3}$ for a first error correction codeword 142 length of 64 bits. In another example, the probability of a bit being written in error may be determined to be $1 \times 10^{-6}$ for a second error correction codeword 142 length of 512 bits. Memory controller 102 may generate an instruction for memory controller 122 to write ECC protected data 252/254 at a particular write speed based on values in write speed table 130. In some examples, values in write speed table 130 may be provided to memory controller 102 prior to data being written to memory chips 104, 112, and/or 114. In other examples, information stored in write speed table 130 may be provided to memory controller 102 in a continuous or periodic or otherwise repeated manner.

Write speed table 130 may include a write speed field 210 and a write error probability field 212. Values in write speed field 210 may be associated with corresponding values (e.g., values in the same row of write speed table 130) in write error probability field 212. Write speed field 210 may include amounts of time related to a speed of writing information to memory chips 104, 112, and/or 114. Write error probability field 212 may include probabilities of experiencing a bit written in error when data is written to memory chips 104, 112, and/or 114 at the corresponding write speed. Memory controller 102 may determine a particular write speed for writing data to memory chips 104, 112, and/or 114 based on a write error probability associated with a particular error correction codeword 142. The particular error correction codeword 142 may, in turn, be based on read unit length information 140.

In an example, data 204 may be received by memory controller 102. Data 204 may include one or more bits to be written to memory chip 104. Read unit length module 108 may receive read unit length information 140 for data 204. In the example, read unit length information 140 for data 204 may be 256 bits. In response, error correction code engine 106 may determine that error correction codeword 144 should be 128 bits in length, based on read unit length information 140. In the example, a 128 bit error correction codeword may have an associated write error probability of $1 \times 10^{-5}$. Error correction code engine 106 may add error correction codeword 144 to data 204 to produce ECC protected data 254. Memory controller 102 may generate an instruction to store ECC protected data 254 in memory chip 104. Memory controller 102 may send the instruction to memory controller 122. Memory controller 122 may consult write speed table 130 to determine a write speed 210 for ECC protected data 254. In the example, since ECC protected data 254 includes a write error probability 212 of $1 \times 10^{-5}$, memory controller 122 may determine that a write speed 210 of 3 nanoseconds is appropriate, based on write speed table 130. Memory controller 122 may write ECC protected data 254 to memory chip 104 at a write speed which may have a write speed 210 of about 3 nanoseconds.

Among other features, memory controllers with read unit length modules arranged in accordance with the present disclosure may allow for reduced write latencies in non-volatile, volatile, or resistive memory technologies. Read unit length information may be used to determine a length or size of error correction code to be added to data. Faster write speeds may be used in cases where the error correction code based on the read unit length exceeds the error correction code based on the length of data.

Figure 3:
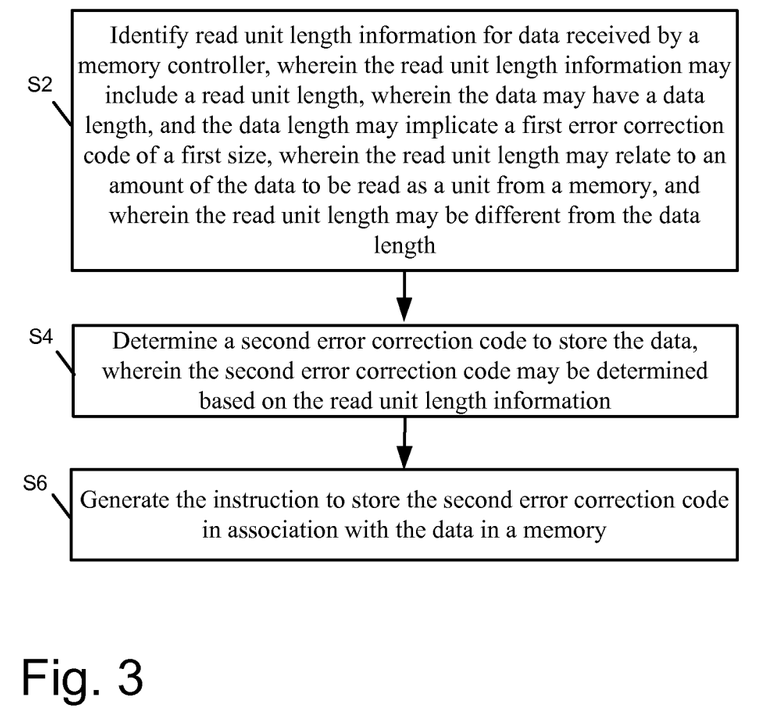
FIG. 3 depicts a flow diagram for an example process to implement a memory controller with read unit length module.

FIG. 3 depicts a flow diagram for example process to implement a memory controller with read unit length module, arranged in accordance with at least some embodiments described herein. In some examples, the process in FIG. 3 could be implemented using system 100 discussed above and could be used to adjust write speeds based on read unit length information. An example process may include one or more operations, actions, or functions as illustrated by one or more of blocks S2, S4, S6, and/or S8, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 3 may be used by a processor, such as processor 110, or by some combination of an error correction code engine (such as error correction code engine 106) and/or a read unit length module (such as read unit length module 108), as described above.

Processing may begin at block S2, "Identify read unit length information for data received by a memory controller, wherein the read unit length information may include a read unit length, wherein the data may have a data length, and the data length may implicate a first error correction code of a first size, wherein the read unit length may relate to an amount of the data to be read as a unit from a memory, and wherein the read unit length may be different from the data length." At block S2, read unit length information (such as read unit length information 140) may be identified for data (such as data 150) received by a memory controller (such as memory controller 102). In an example, identification of read unit information may include receipt of read unit length information from an application and/or an operating system. The read unit length information may include a read unit length (such as a minimum number of bits to be read together as a unit from the memory). The data may have a data length (such as a number of bits). The data length may implicate a first error correction code of a first size (such as a number of error correction bits of a default error correction codeword). The read unit length (such as read unit length 140) may relate to an amount of the data to be read as a unit from a memory (such as memory chip 104). The read unit length (and/or number of bits) may be different from the data length (and/or number of bits).

Processing may continue from block S2 to block S4, "Determine a second error correction code to store the data, wherein the second error correction code may be determined based on the read unit length information." At block S4, a second error correction code (such as error correction codeword 144) to store the data may be determined. In an example, the second error correction code may include a length of bits. In the example, the length of bits may relate to a probability of a bit read or write error for the data. The second error correction code may be determined in response to the read unit length information. For example, error correction code engine 106 may determine error correction code 144 in response to read unit length information 140.

Processing may continue from block S4 to block S6, "Generate the instruction to store the second error correction code in association with the data in a memory." At block S6, an instruction may be generated to store the second error correction code in association with the data in a memory. For example, memory controller 102 may generate an instruction to store ECC protected data 252, 254 in memory chip 104. In some examples, the instruction may be a first instruction. The data may be read together from the memory in response to a second instruction from an application or an operating system. In some other examples, a current may be controlled through memory cells of the memory so as to store bits of the error correction code as resistance values of the memory cells. In various examples, the memory may include spin transfer torque random access memory, phase change memory, and/or resistive memory. In some further examples, a write speed may be determined based on the error correction code. In an example, memory controller 102 may generate an instruction for ECC protected data 252, 254 to be written to memory chip 104 at a particular write speed.

Figure 4:
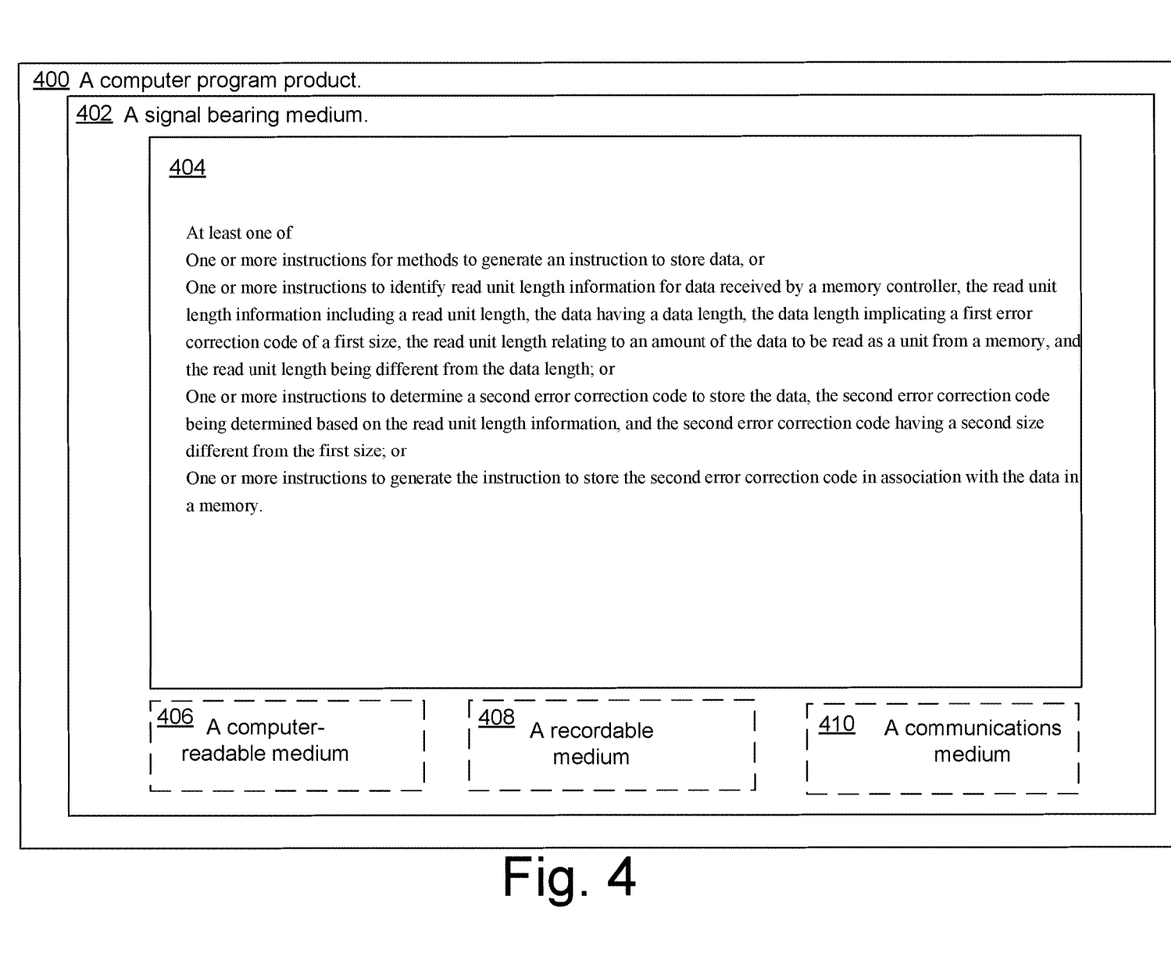
FIG. 4 illustrates an example computer program product that can be utilized to implement a memory controller with read unit length module.

FIG. 4 illustrates an example computer program product 400 that can be utilized to implement a memory controller with a read unit length module, arranged in accordance with at least some embodiments described herein. Computer program product 400 may include a signal bearing medium 402. Signal bearing medium 402 may include one or more instructions 404 that, in response to execution by, for example, a processor, may provide the functionality and features described above with respect to FIGS. 1-3. Thus, for example, referring to system 100, processor 110, error correction code engine 106, and/or read unit length module 108 may undertake one or more of the blocks shown in FIG. 4 in response to instructions 404 conveyed to system 100 by signal bearing medium 402. In some examples, instructions 404 may be stored in a memory, such as memory chip 104.

In some implementations, signal bearing medium 402 may encompass a computer-readable medium 406, such as, but not limited to, a hard disk drive, a compact disc (CD), a digital video disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, computer program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

Figure 5:
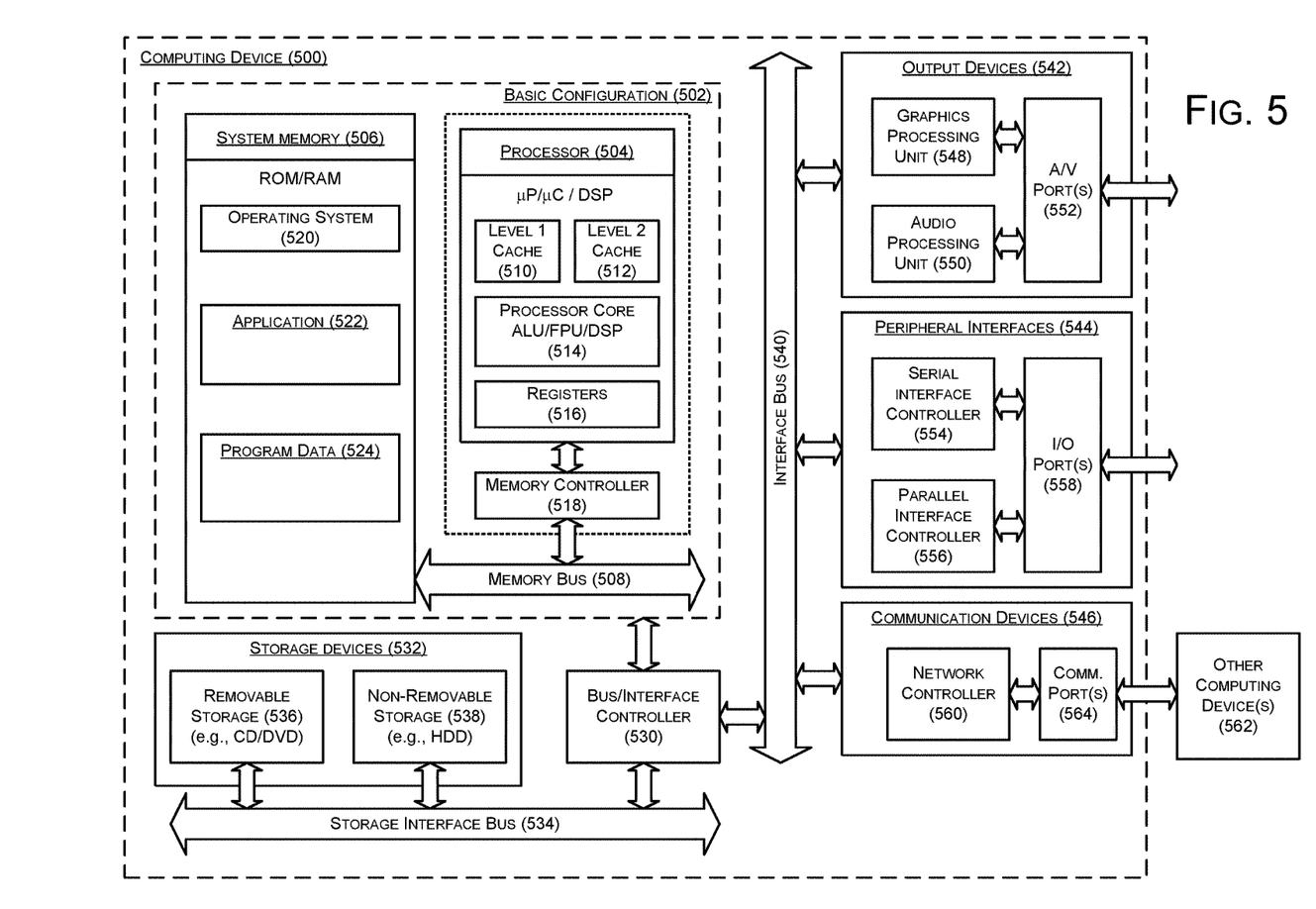
FIG. 5 is a block diagram illustrating an example computing device that is arranged to implement a memory device with read unit length module.

FIG. 5 is a block diagram illustrating an example computing device 500 that is arranged to implement a memory controller with read unit length module, arranged in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 (such as processor 110 of FIGS. 1 and 2) may be of any type including but not limited to a microprocessor (µP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP core), or any combination thereof. An example memory controller 518 (such as, for example, memory controller 102 of FIGS. 1 and 2) may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, such as operating system 160 of FIG. 1. System memory 506 may include one or more applications 522, and program data 524. In some examples, application 522 may include application 162 of FIG. 1. Application 522 may be arranged to perform the functions and operations as described herein including those described with respect to FIGS. 1-4 in connection with system 100. In some examples, program data 524 may include instructions and/or data related to error correction code engine 106, read unit length module 108, and/or write speed table 130. In some examples, application 522 may be arranged to operate in cooperation with program data 524 and/or operating system 520 such that a memory controller with read unit length module may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory, resistive memory, or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 Cells refers to groups having 1, 2, or 3 Cells. Similarly, a group having 1-5 Cells refers to groups having 1, 2, 3, 4, or 5 Cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to generate an instruction to store data, the method comprising:
   identifying read unit length information for data received by a memory controller, wherein the read unit length information includes a read unit length, wherein the data has a data length, and the data length corresponds to a first error correction code of a first size, wherein the read unit length relates to an amount of the data to be read as a unit from a memory, and wherein the read unit length is different from the data length;
   determining a second error correction code to store the data, wherein the second error correction code is determined based on the read unit length information, and wherein the second error correction code has a second size different from the first size; and
   generating the instruction to store the second error correction code in association with the data in the memory.

2. The method of claim 1, wherein the instruction includes a first instruction, and wherein the read unit length information indicates a minimum amount of the data which will be read together as the unit from the memory, wherein the data will be read together from the memory in response to a second instruction from an application or an operating system.

3. The method of claim 1, wherein identifying the read unit length information for the data comprises receiving the read unit length information from an application or an operating system.

4. The method of claim 1, wherein the second error correction code includes a number of bits, and wherein the number of bits relates to a probability of a bit read or write error for the data.

5. The method of claim 1, wherein the data includes first data, the read unit length information includes first read unit length information, the instruction includes a first instruction, and the method further comprises:
   identifying second read unit length information for second data received by the memory controller, wherein the second read unit length information includes a second read unit length, wherein the second data has the data length, wherein the second read unit length relates to an amount of the second data to be read as the unit from the memory, and wherein the second read unit length is different from the first read unit length and the data length;
   determining a third error correction code to store the second data, wherein the third error correction code is determined in response to the second read unit length information, and wherein the third error correction code has a different length than the first error correction code and the second error correction code; and
   generating a second instruction to store the third error correction code in association with the second data in the memory.

6. The method of claim 1, further comprising controlling a current through memory cells of the memory so as to store bits of the first error correction code and the second error correction code as resistance values of the memory cells.

7. A memory controller effective to generate an instruction for data to be written to a memory, the memory controller comprising:
   an error correction code engine; and a read unit length module effective to be in communication with the error correction code engine;

the read unit length module effective to:
identify read unit length information for received data, wherein the read unit length information includes a read unit length, wherein the data has a data length, and the data length corresponds to a first error correction code of a first size, wherein the read unit length relates to an amount of the data to be read as a unit from the memory, and wherein the read unit length is different from the data length;

the error correction code engine effective to:
determine a second error correction code to store the data, wherein the second error correction code is determined based on the read unit length information, and wherein the second error correction code has a second size different from the first size;

determine a write speed based on the second error correction code; and generate the instruction for the data to be written to the memory at the write speed.

8. The memory controller of claim 7, wherein the instruction includes a first instruction, and wherein the read unit length information indicates a minimum amount of the data which will be read together as the unit from the memory, wherein the data will be read together from the memory in response to a second instruction from an application or an operating system.

9. The memory controller of claim 7, wherein the error correction code engine is further effective to receive the read unit length information from an application or an operating system under execution by a processor.

10. The memory controller of claim 7, wherein the second error correction code includes a number of bits, and wherein the number of bits relates to a probability of a bit read or write error for the data.

11. The memory controller of claim 7, wherein the memory includes at least one of spin transfer torque random access memory, phase change memory, or resistive memory.

12. The memory controller of claim 7, wherein the memory controller is further effective to control a steering current through memory cells of the memory so as to write the data to the memory.

13. A method to generate an instruction for data to be written to a memory chip, the method comprising:
determining read unit length information for data, wherein the read unit length information includes a read unit length, wherein the data has a data length, and the data length corresponds to a first write speed and a first error correction code of a first size, wherein the read unit length information relates to an amount of the data to be read as a first unit from the memory chip, and wherein the read unit length is different from the data length;

determining a second error correction code for the data, wherein the second error correction code is determined based on the read unit length information, and wherein the second error correction code has a second size different from the first size;

determining a second write speed based on the second error correction code, wherein the second write speed is different from the first write speed; and generating the instruction for the data to be written to the memory chip at the second write speed.

14. The method of claim 13, wherein the first write speed is slower than the second write speed.

15. The method of claim 13, wherein the instruction includes a first instruction, and wherein the read unit length information indicates a minimum amount of the data which can be read together as the unit from the memory chip, wherein the data will be read together from the memory chip in response to a second instruction from an application or an operating system.

16. The method of claim 13, wherein determining the read unit length information for the data comprises receiving the read unit length information from an application or an operating system.

17. The method of claim 13, wherein:
the first error correction code includes a first number of bits, wherein the first number of bits relates to a first probability of bit storage error for the data; and
the second error correction code includes a second number of bits, wherein the second number of bits relates to a second probability of bit storage error for the data.

18. A memory device effective to store data, the memory device comprising:
a memory controller; and
one or more memory cells configured to be in communication with the memory controller;
for data that has a data length that corresponds to a first error correction code of a first size, the memory controller being effective to:
receive a second error correction code in association with the data, wherein the second error correction code is based on a read unit length for the data, wherein the read unit length relates to an amount of the data to be read as a unit from the one or more memory cells, wherein the read unit length is different from the data length, and wherein the second error correction code has a second size different from the first size; and
write the data to the one or more memory cells at a write speed, wherein the write speed is based on the second error correction code.

19. The memory device of claim 18, wherein the memory controller is further effective to write the second error correction code in association with the data in the one or more memory cells at the write speed.

20. The memory device of claim 18, wherein the memory controller is further effective to control a current through the one or more memory cells so as to store the data in the one or more memory cells.

* * * * *